Feb. 21, 1967  R. RAUTER  3,305,396
METHOD OF PRODUCING SECONDARY DRY CELLS WITH LEAD
ELECTRODES AND SULFURIC ACID ELECTROLYTE
Filed March 30, 1965
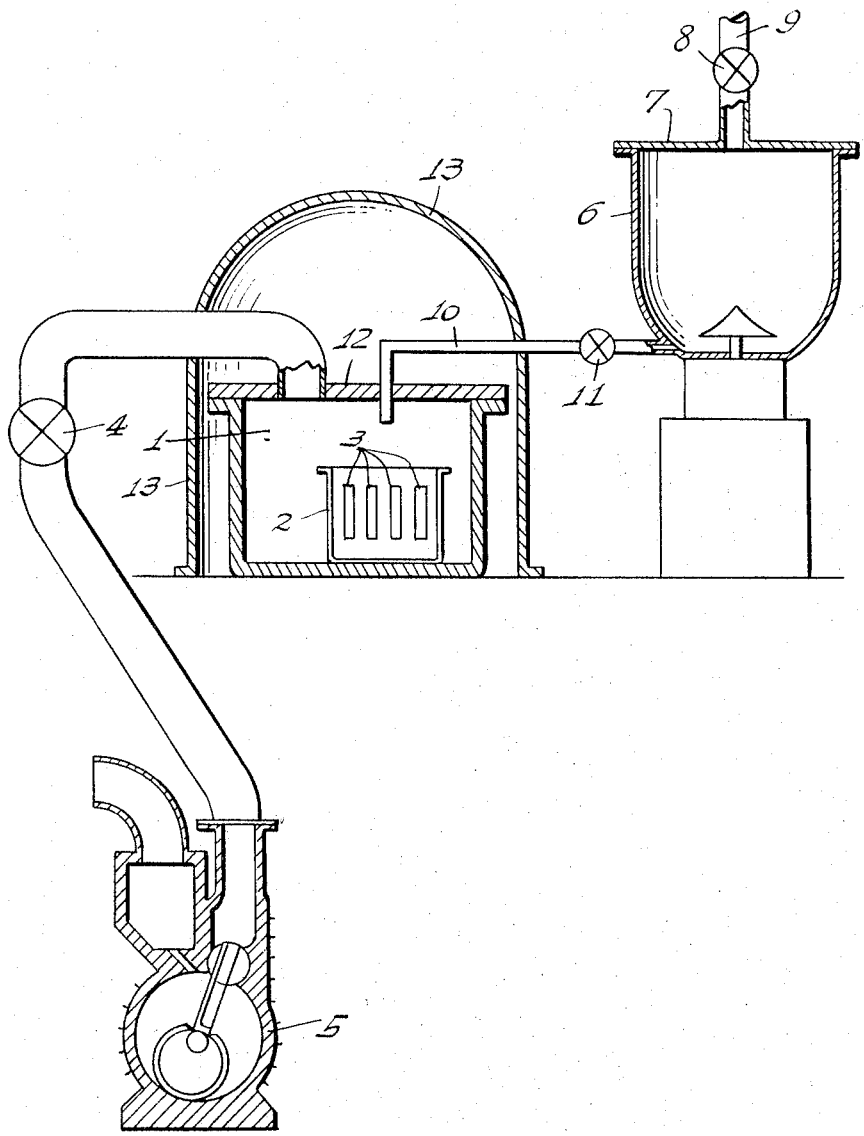
INVENTOR.
RUDOLF RAUTER
BY
Sam Kurlansky

3,305,396
METHOD OF PRODUCING SECONDARY DRY CELLS WITH LEAD ELECTRODES AND SULFURIC ACID ELECTROLYTE

Rudolf Rauter, Munich, Germany, assignor to Marc (Illinois) Inc., Villa Park, Ill.
Filed Mar. 30, 1965, Ser. No. 443,815
The portion of the term of the patent subsequent to Apr. 27, 1982, has been disclaimed
2 Claims. (Cl. 136—6)

This application is a continuation-in-part of U.S. patent application Serial Number 93,265, filed March 3, 1961, now United States Patent Number 3,180,760.

The invention relates to a method of producing dry batteries which contain a mixture of sulfuric acid and silicic acid as dry electrolyte. It is known in dry batteries with lead electrodes to use dry electrolyte composed of sulfuric acid and silicic acid. The silicic acid used for this purpose was first produced by treating silicates with alkalis in aqueous phase. Owing to the alkali residues, which can never be removed entirely and which are extremely detrimental for batteries, such dry electrolytes have, however, scarcely been used at all. To avoid the detrimental effects of the alkali content it is also known to produce a colloidally dispersed silicic acid for use in the dry electrolytes by various processes such as mentioned in British Patent No. 785,848, including the hydrolysis of silicon tetrachloride. This colloidal silicic acid is free from alkali, has a degree of purity of 99.9% and can be produced in particle sizes measured in microns, as for example of about 5 to 20μ or less as given in the identified British patent. Dry electrolytes which consist of sulfuric acid and such a colloidal silicic acid produced from silicon tetrachloride, give much better results than dry electrolytes containing silicic acid which is obtained by the alkali treatment of silicates as stated in the British patent identified. However, even the dry electrolytes improved in this manner are open to numerous objections which oppose their use on a large scale. These dry electrolytes shrink with ageing, with the result that the activated composition is covered, a considerable loss in voltage takes place, a sulfating of the electrodes and therefore a loss of activity occurs and self-discharge ensues. It has already been endeavoured to overcome these objections by introducing into the electrolyte additions of aluminium hydroxide, beryllium sulfate, pure soot or a skeleton of glass fibres or the like. Nevertheless, it has been found that such additions are rather injurious than advantageous. A skeleton of glass fibres or the like unavoidably introduces impurities, especially of an alkaline nature, into the electrolyte so that the electrolyte is also considerably worsened thereby.

Now the object of the invention is to overcome these objections without additions to the electrolyte and without the necessity of using a skeleton.

The method according to the invention for the production of dry cells with lead electrodes and sulfuric acid electrolyte consisting of sulfuric acid and colloidal silicic acid obtained from silicic on chloride is characterized in that the formed electrodes inserted in the cell housing are subjected, immediately following a preliminary treatment in diluted sulfuric acid, to a vacuum for an effective period of time, as at least 15 minutes with continuous exhaustion of the gases given off, and that the prepared thixotropic electrolyte consisting of sulfuric acid and colloidally dispersed silicic acid with a high degree of purity is reduced to liquid state in a high-speed mixer and introduced into the cell housing placed in an evacuated space.

By the method according to the invention a dry battery is produced in which extremely intimate contact exists between the electrolyte and the electrodes. The electrolyte has no longer any tendency to shrink. Besides overcoming the objections inherent in the former dry batteries, the batteries according to the invention also possess the advantage that, even in the case of overcharging, no strong gas formation takes place which would make it necessary to top-up with distilled water and which might be extremely dangerous in the case of a gas and liquid-proof housing.

Although it is already known to draw the electrolyte in to a battery jar containing the electrodes under the action of a temporary vacuum, filling the electrolyte under vacuum in this manner is not capable of producing the special effects of the vacuum treatment of the plates themselves for an effective time period directly following a pretreatment with sulfuric acid.

The sulfuric acid pre-treatment of the electrodes directly preceding the vacuum treatment can, according to one embodiment of the invention, be the forming operation in diluted sulfuric acid itself. The vacuum treatment of the electrodes is then introduced immediately following the pouring off of the forming acid. If, however, the electrodes are stored in formed state, when it is a question of producing the finished dry cell, the formed dry electrodes for the sulfuric acid pre-treatment are, according to the invention first additionally dipped in diluted sulfuric acid and the vacuum treatment then follows immediately after this additional sulfuric acid pre-treatment.

An embodiment of the invention is hereinafter described with reference to the accompanying drawing.

The apparatus for carrying out the method according to the invention and shown diagrammatically in the accompanying drawing comprises a vacuum chamber 1 into which the battery housing 2 containing the electrodes 3 is placed. The vacuum chamber is connected through the intermediary of a shutoff valve 4 to a vacuum pump 5 which is in the example illustrated a mechanical pump but which might equally well be a vacuum pump of some other type, for example, liquid or steam ejector pump or the like. A high-speed mixer 6, provided for the pre-treatment of the electrolyte, is also connected to the vacuum chamber 1. This high-speed mixer 6 is a highly efficient, high-speed mixer of conventional type. It is closed at the top by a lid 7. In this lid 7 a connecting piece 9 closable by a valve 8 is provided and a vacuum pump or a feed conduit for inert gas or the like can be connected to this connecting piece. The connection between the high-speed mixer 6 and the vacuum chamber 1 preferably consists of a flexible conduit 10 which is closable by means of a valve 11 and leads into the lower part of the high-speed mixer 6.

With this apparatus the method according to the invention is carried out in the following manner:

The electrodes 3 are placed in the dry cells in the usual way for producing dry batteries and connected up with their terminal lugs in the conventional manner. If it is a case of freshly produced battery electrodes, these electrodes 3 are first formed in the housing in the usual manner with diluted sulfuric acid. At the end of the forming procedure, the forming acid is poured off and the housing 2 containing the electrodes 3 is placed directly in the vacuum chamber 1. The vacuum chamber 1 is closed by a lid 12 and covered with a light and ultra-violet ray screening 13. The vacuum chamber 1 is then evacuated by the vacuum pump 5 and maintained at a vacuum of about 0.4 to 1.2 inches mercury absolute for an effective period of at least about 15 minutes, the gases given off from the cell housing 2 and the electrodes 3 being sucked off continually.

The electrolyte is first prepared by mixing 20 to 60 parts by weight of concentrated sulfuric acid with about 30 to 50 parts by weight of distilled water and 3 to 15 parts by weight of pulverulent silicic acid. This pulverulent silicic acid is produced by the pyrogenic method from silicon tetrachloride and is absolutely free from alkaline substances. Its degree of purity amounts to 99.9% and its micron particle size may be 5–20μ. However, it may be prepared by various processes, and is sold in Great Britain as a sub-micron silica powder under a number of Registered Trademarks, such as "Aerosil" and "Manosil VN 3." As in British Patent No. 785,848, a suitable colloidal electrolyte may be made by mixing 11 to 15 grams of sub-micron "Aerosil" with 100 millilitres of dilute sulfuric acid, or 30 to 40 grams of sub-micron "Manosil VN 3" with this quantity of acid. The electrolyte thus prepared is a thixotropic mixture which can be produced and stored in large quantities without any difficulty.

Electrolytes disclosed in the prior art are prepared by mixing pulverulent silicon dioxide or silicic acid into dilute sulfuric acid. When the electrolyte is prepared in this manner, a mixture is formed which has a greasy consistency, and which behaves more like an immobilized fluid than a solid body or true gel. Such an electrolyte has the property whereby it can adsorb additional water. The electrolyte is also somewhat unstable in its consistency.

In contrast, the present electrolyte, as described above, is prepared by mixing concentrated sulfuric acid with distilled water and pulverulent silicic acid. In other words, a dispersion of pulverulent silicic acid in distilled water is first formed, and concentrated sulfuric acid is subsequently added to the preformed dispersion. The electrolyte thus prepared acquires the consistency of a true active gel. The presently disclosed electrolyte has the property whereby, after its preparation, it cannot adsorb either additional water or additional sulfuric acid, even when it has been temporarily placed in the fluid condition as by high speed mixing. The electrolyte is also more stable in its gel form than prior art electrolytes. The present electrolyte has the further advantage in that, even when it is in the true gel state, it exhibits electrical conductivity substantially as great as that of pure fluid sulfuric acid electrolytes. Prior art gel electrolytes exhibit greatly reduced conductivities. It is to be understood that the term "distilled water" includes deionized water prepared by any known suitable means such as treatment with an ion exchange resin or electrolysis in cells utilizing permselective membranes.

A quantity of the prepared electrolyte corresponding to the filling of the battery housing is introduced into the high-speed mixer 6 and intensively mixed for about 10 to 15 minutes with exclusion of air and thereby again liquefied. This means that the high-speed mixer 6 charged with the electrolyte is set in operation practically simultaneously with the evacuation of the vacuum chamber 1 but the valve 11 is closed during this period.

To prevent the air present in the high-speed mixer 6 from becoming mixed in the electrolyte, the high-speed mixer 6 can also be evacuated during or shortly before the mixing operation. By this means the electrolyte is also subjected to a cleansing process during the mixing operation.

However, it is also possible to evacuate the high-speed mixer 6 filled with the electrolyte before initiating the mixing operation and to fill it with an inert gas through the connecting piece 9, whereby this gas becomes partly mixed with the electrolyte during the mixing operation.

As the commencement of the vacuum treatment and the mixing operation are so synchronized that they terminate at the same time, it is only necessary to close the valve 4 and open the valve 11 at the end of the vacuum treatment period. The electrolyte intimately mixed and liquefied with exclusion of air, then flows through the pipe conduit 10 into the battery housing 2 placed in the vacuum chamber 1 and clings closely to the battery plates. When the battery housing 2 is completely filled with the electrolyte, the valve 11 can be again closed. The chamber 1 is then ventilated by means of an air inlet not shown in the drawing. Thereby the incoming air improves the bond between the electrolyte and the battery plates when it bears with pressure on the surface of the electrolyte.

The electrolyte can be introduced into the battery housing even with the valve 4 open. This is particularly advantageous when the electrolyte has absorbed appreciable quantities of inert gas or the like while being treated in the high-speed mixer 6. This gas then serves as a rinsing gas which, on the electrolyte entering the vacuum chamber 1, is sucked out of the electrolyte and in the process carries impurities with it. Particularly favourable results can be attained with the method according to the invention if the vacuum treatment of the battery electrodes 3 and the filling of electrolyte is carried out with screening against light and ultra-violet rays.

After the electrolyte has been filled into the battery housing 2, the latter is allowed to settle for at least 8 hours. and the liquid which forms during the ageing is poured off. Then the battery is sealed in the usual gas and liquid-tight manner.

The lead electrodes used for the batteries according to the invention are preferably chosen relatively thin so that a good ratio is obtained between the surface and weight. All portions of these relatively thin lead electrodes are also far more fully exposed to the vacuum treatment than relatively thick electrodes. The forming operation of the electrodes 3 is preferably carried so far that the active composition of the positive electrode is completely converted into lead oxide and the active composition of the negative electrode is completely converted into lead sponge. The formed or sulfuric acid pre-treated electrodes should be introduced into the vacuum chamber as quickly as possible after the acid has been poured off so as to prevent the electrodes from absorbing carbon dioxide or other gases in the interval.

At is has not hitherto been possible to produce with any known methods dry batteries in which the dry electrolyte does not form any cracks nor shrink when stored for a longer period, the dry batteries produced according to the invention possess considerable advantages over all former batteries based on sulfuric acid and silicic acid. Above all the invention enables for the first time the fundamental advantages obtained by the dry batteries to be fully utilized. These advantages consist in that the battery can be stored in any position, is immune to vibration and cannot produce short circuits and presents no transport difficulties. As practically no gases are generated during the charging of the battery, it can be completely closed. By the method according to the invention the high purity dry electrolyte is particularly well protected against colloidal action with the result that the self-discharge is less than in the case of conventional sulfuric acid batteries. The dry batteries produced according to the invention, being very insensitive to vacuum and pressure, are particularly well suited for use in aircraft, rockets and also in submarines.

I claim:

1. A method for the production of a secondary dry cell having lead electrodes contained in a cell housing which comprises pre-treating said electrodes by dipping in dilute sulfuric acid prior to being subjected to vacuum conditions, subjecting the electrodes while contained in said cell housing to vacuum conditions for a predetermined effective period during which period there is continuous exhaustion of gases liberated, preparing a thixotropic electrolyte by adding 20–60 parts by weight of concentrated sulfuric acid to a dispersion of about 30–50 parts by weight of distilled water and 3–15 parts by weight of pulverulent silicic acid, said silicic acid being absolutely free of alkaline substances and having a degree of purity of 99.9% and having a particle size of 5–20 microns, liquefying said thixotropic electrolyte by intensive stirring and mixing prior to being introduced into said cell housing, introducing said thixotropic electrolyte into said cell housing while maintaining said cell housing under vacuum conditions, and subsequently subjecting the introduced electrolyte to atmospheric pressure.

2. A secondary dry cell comprising a cell housing, lead electrodes mounted therein, and a thixotropic electrolyte, said cell having been prepared by pre-treating said electrodes by dipping in dilute sulfuric acid prior to being subjected to vacuum conditions, subjecting the electrodes while contained in said cell housing to vacuum conditions for a predetermined effective period during which period there is continuous exhaustion of gases liberated, preparing a thixotropic electrolyte by adding 20–60 parts by weight of concentrated sulfuric acid to a dispersion of about 30–50 parts by weight of distilled water and 3–15 parts by weight of pulverulent silicic acid, said silicic acid being absolutely free of alkaline substances and having a degree of purity of 99.9% and having a particle size of 5–20 microns, liquefying said thixotropic electrolyte by intensive stirring and mixing prior to being introduced into said cell housing, introducing said thixotropic electrolyte into said cell housing while maintaining said cell housing under vacuum conditions, and subsequently subjecting the introduced electrolyte to atmospheric pressure.

References Cited by the Examiner

UNITED STATES PATENTS

| 3,096,215 | 7/1963 | Voss et al. | 136—6 |
| 3,172,782 | 3/1965 | Jache | 136—6 |
| 3,180,760 | 4/1965 | Rauter | 136—6 |

FOREIGN PATENTS 507,035  6/1938  Great Britain.

WINSTON A. DOUGLAS, *Primary Examiner.*

B. J. OHLENDORF, *Assistant Examiner.*